United States Patent [19]

Kan et al.

[11] 4,417,027

[45] Nov. 22, 1983

[54] RUBBER COMPOSITION FOR SIDE WALL OF TIRE

[75] Inventors: Masanori Kan, Amagasaki; Takuya Okazaki, Toyonaka; Tatsuo Sakashita, Suita, all of Japan

[73] Assignee: The Toyo Rubber Industry Co., Ltd., Osaka, Japan

[21] Appl. No.: 389,691

[22] Filed: Jun. 18, 1982

[30] Foreign Application Priority Data

Jun. 27, 1981 [JP] Japan ................................ 56-100083

[51] Int. Cl.³ .......................... C08L 7/00; C08L 9/00; C08L 9/06; C08L 53/02
[52] U.S. Cl. ...................................... 525/99; 525/250
[58] Field of Search .................................. 525/99, 250

[56] References Cited

U.S. PATENT DOCUMENTS

| 4,248,981 | 2/1981 | Milkovich et al. | 525/250 |
| 4,255,296 | 5/1981 | Ogawa et al. | 525/99 |
| 4,346,193 | 8/1982 | Warfel | 525/250 |

FOREIGN PATENT DOCUMENTS 56-73954  6/1981  Japan .

*Primary Examiner*—Allan Lieberman
*Attorney, Agent, or Firm*—Koda and Androlia

[57] ABSTRACT

A rubber composition for a side wall of tires comprising a polymer blend of 20-100 parts by weight of solution polymerization star shaped SBR and 80-0 parts by weight of natural rubber and/or diene synthetic rubber. The glass transition temperature (Tg) of said star shaped SBR is preferably less than −50° C. Styrene content in said star shaped SBR is preferably less than 20% parts by weight.

1 Claim, No Drawings

RUBBER COMPOSITION FOR SIDE WALL OF TIRE

BACKGROUND OF THE INVENTION

1. Field of Invention

The present invention relates to a rubber composition for side wall of tires and more particularly to the improvement of the properties thereof in respect to bare spots, crack resistance, vulcanization-reverse and so forth.

2. Prior Art

General-purpose rubber polymers such as natural rubber (ab. NR), butadiene rubber (ab. BR) or general-purpose styrene-butadiene rubber (ab. SBR) have been conventionally used as the rubber polymers for a side wall of a tire. For preventing bare spots from being formed on a surface of a side wall, inorganic powder paste, e.g., carbon black paste comprising carbon blacks, volatile component and a small amount of binder is applied on a side wall portion in order to make it easy for the rubber polymers of a green tire to flow smoothly along the inner face of a metal mold without partially adhering thereto in the course of vulcanization and thereby not to entrap the air between the mold and the green tire but to lead the air to a vent hole so as to exhaust outside. The bare spots are caused by some factors such as vulcanizing speed, flowability of rubber polymer with a continued deformation under a high temperature and a load namely, flow behavior, smoothness of green tire surface and so forth.

As described above, bare spots are restrained in prior arts, by applying a carbon paste on a green tire to put an inorganic powder as an inadhesive lubricant between the inside of a metal mold and a rubber polymer and also on the other hand by making a smooth surface of a green rubber a little irregular enough for the air to be exhausted outside of a metal mold at an earlier stage of molding. But said carbon paste is not preferable because of occurrence of cracks on the surface of a side wall easily caused by ozone attack.

SUMMARY OF THE INVENTION

It is an object of the present invention to provide an improved rubber composition for a side wall with respect to bare spots, crack resistance, vulcanization-reverse and other properties. The inventors have made various investigations and experiments about flow behavior of rubber polymers and have found that solution polymerization SBR is vulcanized a little slower than the conventional general-purpose polymers and that the flow behavior is especially preferable at a high temperature as compared with the conventional general-purpose polymers. The inventors have also found that solution polymerization star shaped SBR shows the most preferable properties for the polymer to be used for a side wall. Namely, a rubber composition containing solution polymerization star shaped SBR is execellent in the flow behavior at a high temperature in moldings. And also a little slower vulcanization thereof takes rather advantage in that the air in the mold is led smoothly to a vent hole and exhausted outside. Thus a smooth side wall having no bare spots is provided.

DETAILED DESCRIPTION OF THE INVENTION

A rubber composition containing a carbon like as a tire composition is generally vulcanized at a high temperature and in a short period of time. But natural rubber and butadiene rubber takes vulcanization-reverse at a high temperature, so that the properties are diminished, while solution polymerization star shaped SBR enjoys good property in the vulcanization-reverse. As a result, the properties of a rubber composition containing said polymer can be improved.

As described above, the use of the specific rubber polymer makes it possible to prevent the occurence of bare spots on a side wall without applying carbon paste on the side wall. Thus, the process of applying carbon paste can be omitted. Furthermore, there occurs no crack caused by ozone attack due to the employment of carbon paste. This means that the use of the rubber polymer according to the present invention contributes much in shortening the manufacturing process and in improving the quality of a tire.

Hereinafter, the embodiments of rubber compositions of side walls are exemplified in more detail.

In the following Table, comparison is made as to the percentage of occurence of bare spots among test tires wherein side walls comprise different combinations of rubber polymers.

TABLE

| | Parts by weight | | | | | | |
|---|---|---|---|---|---|---|---|
| | Composition No. | | | | | | |
| | Comparisons | | Embodiments | | | | |
| Component | 1 | 2 | 3 | 4 | 5 | 6 | 7 |
| Natural rubber | 40 | 50 | | 50 | 40 | 50 | 90 |
| Butadiene rubber | 60 | 30 | | | 20 | 20 | |
| SBR-1500 | | 20 | | | | | |
| Star shaped SBR | | | 100 | 50 | 40 | 30 | 10 |
| ZnO | 3 | 3 | 3 | 3 | 3 | 3 | 3 |
| Stearic acid | 2 | 2 | 2 | 2 | 2 | 2 | 2 |
| Aging resistor (Santoflex 13) | 4 | 4 | 4 | 4 | 4 | 4 | 4 |
| Wax | 2 | 2 | 2 | 2 | 2 | 2 | 2 |
| Carbon (FEF) | 50 | 50 | 50 | 50 | 50 | 50 | 50 |
| Accelarator (CZ) | 1.0 | 1.0 | 1.0 | 1.0 | 1.0 | 1.0 | 1.0 |
| S | 1.8 | 1.8 | 1.8 | 1.8 | 1.8 | 1.8 | 1.8 |
| | Composition No. | | | | | | | |
| Test item | 1 | | 2 | | 3 | 4 | 5 | 6 | 7 |
| Carbon paste | Use | No use | Use | No use | No use | No use | No use | No use | No use |
| Number of tires with bare spot in 100 | 4 | 71 | 3 | 75 | 0 | 1 | 2 | 5 | 28 |

TABLE-continued

| | Parts by weight | | | | | | | | |
|---|---|---|---|---|---|---|---|---|---|
| pcs. of tire Ozone resistance | 10 | 16 | 13 | 25 | 21 | 19 | 23 | 17 | 20 |

Note:
SBR-1500 — Styrene-butadiene rubber by emulsion polymerization, styrene content is 23.5 percent by weight.
Ozone resistance — Test samples of 10 mm width × 150 mm length × 2 mm thickness were exposed in the air containing ozone of a low density, 50 pphm with test samples extended 20%, and the degree of deterioration was compared by means of the length of time until cracks occurred.

As shown in the Table, when the conventional rubber compositions No. 1 and No. 2 were used without applying carbon paste in molding, the percentage of occurence of bare spots was 71% and 75% respectively. On the other hand, in the test sample No. 7 containing only 10% of star shaped SBR the percentage was reduced by 1/2.5-1/2.7 thereof, namely, 28%. 30% contents of star shaped SBR, No. 6 showed almost the same percentage of occurence of bare spots with that of the tires comprising the conventional rubber compositions and molded with the application of carbon paste. More than 30% contents of star shaped SBR remarkably diminish the occurence of bare spots and at last no bare spot was formed. Ozone resistance was also remarkably superior to that of the conventional rubber composition with the application of carbon paste.

Besides, the properties of the star shaped SBR eliminate the deterioration of rubber compositions due to the vulcanization-reverse.

As described in the Japanese Patent Application No. 56-73954 developed by the same inventors, the occurence of mechanical cracks by a de mattia testing machine tends to increase if the styrene content in the star shaped SBR is more than 20% and the glass transition temperature (Tg) is more than −50° C. (Glass transition temperature were measured with a measuring machine of DSC-2 made by PERKIN-ELMER CO., LTD. The speed of temperature rise was 20° C./min).

Accordingly, it is desirable that the styrene content of star shaped SBR is less than 20% and glass transition temperature (Tg) is less than −50° C.

It is apparent that the use of the rubber composition according to the present invention not only improves the quality of a side wall of a tire but also contributes much in reducing the manufacturing process of a tire and in making the manufacturing process smooth.

What is claimed is:

1. A rubber composition for tire side walls comprising:
   30-70 parts by weight of solution polymerization star shaped SBR having a glass transistion temperature of less than −50° C., said star shaped SBR further having a styrene content less than 20 percent by weight; and
   70-30 parts by weight of a rubber selected from the group consisting of natural rubber, diene synthetic rubber and mixtures thereof, wherein said rubber and said star shaped SBR comprise 100 percent of the polymer material in the composition.

* * * * *